United States Patent
Meimberg et al.

(10) Patent No.: US 12,018,975 B2
(45) Date of Patent: Jun. 25, 2024

(54) ULTRASOUND AND THERMAL MASSFLOW IN ONE FLOW CHANNEL

(71) Applicant: Honeywell International Inc., Morris Plains, NJ (US)

(72) Inventors: Tobias Meimberg, Osnabrueck (DE); Ralf Schroeder genannt Berghegger, Glandorf (DE); Christian Lampe-Juergens, Spelle (DE); Andreas Wuchrer, Georgsmarienhuette (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 418 days.

(21) Appl. No.: 17/198,615

(22) Filed: Mar. 11, 2021

(65) Prior Publication Data
US 2022/0291036 A1     Sep. 15, 2022

(51) Int. Cl.
*G01F 25/10*     (2022.01)
*G01F 1/667*     (2022.01)
(Continued)

(52) U.S. Cl.
CPC ............. *G01F 25/10* (2022.01); *G01F 1/667* (2013.01); *G01F 1/696* (2013.01); *G01N 11/02* (2013.01);
(Continued)

(58) Field of Classification Search
CPC .......... G01F 25/10; G01F 1/667; G01F 1/696; G01F 1/684; G01F 1/66; G01F 1/68;
(Continued)

(56) References Cited

U.S. PATENT DOCUMENTS

| 4,365,518 A | 12/1982 | Zacharias |
| 4,523,478 A | 6/1985 | Zacharias |

(Continued)

FOREIGN PATENT DOCUMENTS

| CN | 102322907 A | 1/2012 |
| CN | 204854843 U | 12/2015 |

(Continued)

OTHER PUBLICATIONS

Extended European Search Report dated Jul. 19, 2022 issued in connection with corresponding EP Application No. 22157676.2 (10 pages total).

*Primary Examiner* — Benjamin R Schmitt
(74) *Attorney, Agent, or Firm* — John Maldjian, Esq.; Stevens & Lee PC

(57) ABSTRACT

A system includes a flow tube configured to receive a flow measured by an ultrasonic flow measurement, wherein a center region of the flow tube is configured to have a drop in pressure. The system also includes a heat source/hot wire and temperature sensors configured to enable a flow measured by a thermal massflow measurement. In the system, a controller is configured to compare the flow measured by the ultrasonic flow measurement to the flow measured by the thermal massflow measurement. The controller determines a ratio of the flow measured by an ultrasonic flow measurement to the flow measured on by the flow measurement based on thermal massflow. The controller also calculates a density, a thermal conductivity and an energy and/or gas content of the gas.

20 Claims, 7 Drawing Sheets

(51) Int. Cl.
*G01F 1/696* (2006.01)
*G01N 11/02* (2006.01)
*G01N 25/18* (2006.01)
*G01F 1/684* (2006.01)
*G01N 11/00* (2006.01)
*G01N 25/40* (2006.01)

(52) U.S. Cl.
CPC .............. *G01N 25/18* (2013.01); *G01F 1/684* (2013.01); *G01N 2011/0093* (2013.01); *G01N 25/40* (2013.01)

(58) Field of Classification Search
CPC .......... G01F 5/00; G01F 25/15; G01N 11/02; G01N 25/18; G01N 25/40; G01N 2011/0093
See application file for complete search history.

(56) References Cited

U.S. PATENT DOCUMENTS

| | | |
|---|---|---|
| 5,243,863 A | 9/1993 | Gill |
| 5,777,237 A | 7/1998 | Collier |
| 6,186,179 B1 | 2/2001 | Hill |
| 6,338,277 B1 | 1/2002 | Diston |
| 7,600,417 B2 | 10/2009 | Paradise |
| 8,689,638 B2 | 4/2014 | Shen |
| 9,222,811 B2 | 12/2015 | Sonnenberg |
| 10,101,186 B2 | 10/2018 | Pretre |
| 10,184,816 B2 | 1/2019 | Sugiyama et al. |
| 2016/0138951 A1 | 5/2016 | Pretre |
| 2016/0369624 A1 | 12/2016 | Ahmad |
| 2018/0058691 A1* | 3/2018 | Cool ........................ G01F 1/684 |
| 2019/0154483 A1 | 5/2019 | Hoheisel |
| 2020/0179629 A1 | 6/2020 | Burgess et al. |
| 2020/0400473 A1 | 12/2020 | Andrii et al. |

FOREIGN PATENT DOCUMENTS

| | | |
|---|---|---|
| CN | 106979808 A | 7/2017 |
| CN | 109612542 A | 4/2019 |
| EP | 0790490 B1 | 8/1997 |
| EP | 3021117 A1 | 5/2016 |
| IT | 201800008052 A1 | 2/2020 |
| JP | 2019196905 A | 11/2019 |

* cited by examiner

ULTRASOUND AND THERMAL MASSFLOW IN ONE FLOW CHANNEL

TECHNICAL FIELD

The present disclosure generally relates to comparing a gas flow based on an ultrasonic measurement to a flow measurement based on a thermal massflow within a gas meter system.

BACKGROUND

All gas meters have ageing effects. Further, to ensure a high accuracy over the lifetime of the gas meters, countries have introduced sample lot procedures. However, sample lot procedures are expensive, and the commercial need is to eliminate the sampling procedure.

Gas meters also typically indicate the volume and show how much volume of gas was consumed in a defined time scale. After this procedure, the overall energy is calculated, and the customer is then billed. The customer is only billed after the energy is first calculated. The energy is also calculated only after the total volume of gas that was consumed within a time period is determined.

Accordingly, there is a need to eliminate the conventional step of energy calculation by directly measuring the energy instead of volume. This can result in reducing the amount of calculation involved and make the final energy calculated more accurate in comparison to the conventional procedure.

As such, there is a need to eliminate the conventional sampling procedure by a redundant flow measurement with independent technologies. Moreover, there is a need to detect all possible failure modes to ensure a higher accuracy and correct measurement over the whole lifetime for all gas meters.

SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is another aspect of the disclosed embodiments to provide for a gas meter to continuously check its overall functioning.

It is another aspect of the disclosed embodiments to provide a method and system for a gas meter to determine its functioning based on a series of criteria.

The aforementioned aspects and other objectives can now be achieved as described herein.

In an embodiment, a system includes a flow tube configured within a medium, wherein the flow tube is configured to receive a flow measured by an ultrasonic flow measurement, wherein a center region of the flow tube is configured to have a drop in pressure as the flow measured by an ultrasonic flow measurement is passing through the flow tube. The system also includes a heat source and temperature sensors configured above the center region of the flow tube, wherein the heat source and temperature sensors are configured to enable a flow measurement measured by a thermal massflow measurement in a bypass during the drop in pressure in the center region of the flow tube. Further, the system includes a controller configured to measure the flow measured by ultrasonic flow measurement and the flow measured by the thermal massflow measurement, wherein the controller compares the flow measured by the ultrasonic flow measurement to the flow measured by the thermal massflow measurement. The controller also determines a ratio for the flow measured by the ultrasonic flow measurement to the flow measured by the thermal massflow measurement to determine if any part of the ultrasonic flow measurement or of the flow measurement based on thermal massflow is functioning correctly.

In an embodiment of the system, the controller determines if the bypass is functioning correctly based on the ratio of the flow measured by the ultrasonic flow measurement to the flow measured by the thermal massflow measurement.

In an embodiment, a system includes a heat source/hot wire and one or more temperature sensors configured at initial first positions, wherein the heat source/hot wire and the one or more temperature sensors are configured to enable a flow measured by a thermal massflow measurement. The system also includes a flow tube, housing, and index configured at second positions, wherein a center region of the flow tube is configured to provide a drop in pressure, wherein a flow measured by an ultrasonic flow measurement occurs within the flow tube, and wherein the flow measured by the ultrasonic flow measurement occurs at a same time interval as the flow measured by the thermal massflow measurement. The system also includes one or more controllers configured to compare the flow measured with the ultrasonic flow measurement with the flow measured with the thermal massflow measurement, and identify a ratio of the flow measured with the ultrasonic flow measurement to the flow measured by the thermal massflow measurement. The one or more controllers also identify whether problems exist with any part of the ultrasonic flow measurement or of the flow measurement based on thermal massflow based on the ratio of the flow measured by the ultrasonic flow measurement to the flow measured by the thermal massflow measurement.

In an embodiment of the system, one of the temperature sensors is configured away from the other temperature sensor.

In an embodiment of the system, negative temperature coefficient (NTC) devices are configured in place of the heat source/hot wire and the one or more temperature sensors.

In another embodiment, a method includes configuring the flow tube to receive a flow measured by an ultrasonic flow measurement, wherein a center region of the flow tube is configured to have a drop in pressure as the flow measured by the ultrasonic flow measurement is passing through the flow tube. The method also includes positioning a heat source and temperature sensors above the center region of the flow tube, wherein the heat source and temperature sensors are configured to enable a flow measured by a thermal massflow measurement in a bypass during the drop in pressure in the center region of the flow tube. The method also includes configuring a controller to compare the flow measured by the ultrasonic flow measurement with the flow measured by the thermal massflow measurement, determine a ratio of the flow measured with the ultrasonic flow measurement with the flow measured by the thermal massflow measurement, determine if any part of the ultrasonic flow measurement or of the flow measurement based on thermal massflow is functioning correctly.

In an embodiment of the system, the flow measured by the ultrasonic flow measurement is equal to the flow measured by the thermal massflow measurement.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Figure 1:
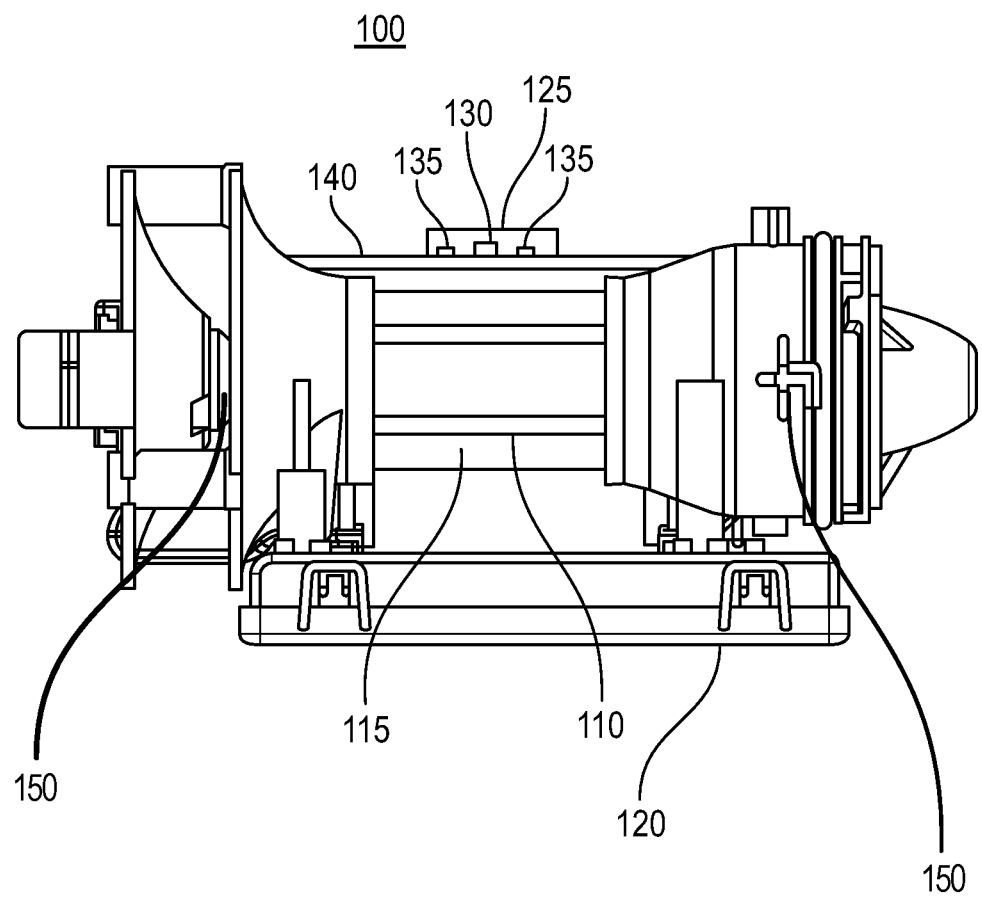
FIG. 1 illustrates a gas meter which can be implemented in accordance with an embodiment of the invention.

Unless otherwise indicated illustrations in the figures are not necessarily drawn to scale.

DETAILED DESCRIPTION OF SOME EMBODIMENTS

Background and Context

The particular values and configurations discussed in these non-limiting examples can be varied and are cited merely to illustrate one or more embodiments and are not intended to limit the scope thereof.

Subject matter will now be described more fully herein after with reference to the accompanying drawings, which form a part hereof, and which show, by way of illustration, specific example embodiments. Subject matter may, however, be embodied in a variety of different form and, therefore, covered or claimed subject matter is intended to be construed as not being limited to any example embodiments set forth herein, example embodiments are provided merely to be illustrative. Likewise, a reasonably broad scope for claimed or covered subject matter is intended. Among other issues, subject matter may be embodied as methods, devices, components, or systems. The followed detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as a "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

One having ordinary skill in the relevant art will readily recognize the subject matter disclosed herein can be practiced without one or more of the specific details or with other methods. In other instances, well-known structures or operations are not shown in detail to avoid obscuring certain aspects This disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Unless defined otherwise, all technical and scientific terms used herein have the same meanings as commonly understood by one of ordinary skill in the art to which the disclosed embodiments belong. Preferred methods, techniques, devices, and materials are described, although any methods, techniques, devices, or materials similar or equivalent to those described herein may be used in the practice or testing of the present invention.

Although claims have been included in this application to specific enumerated combinations of features, it should be understood the scope of the present disclosure also includes any novel feature or any novel combination of features disclosed herein.

References "an embodiment," "example embodiment," "various embodiments," "some embodiments," etc., may indicate that the embodiment(s) so described may include a particular feature, structure, or characteristic, but not every possible embodiment necessarily includes that particular feature, structure, or characteristic.

Headings provided are for convenience and are not to be taken as limiting the present disclosure in any way.

Each term utilized herein is to be given its broadest interpretation given the context in which that term is utilized.

Terminology

The following paragraphs provide context for terms found in the present disclosure (including the claims):

The transitional term "comprising", which is synonymous with "including," "containing," or "characterized by," is inclusive or open-ended and does not exclude additional, unrecited elements or method steps. See, e.g., *Mars Inc.* v. *H. J. Heinz Co.*, 377 F.3d 1369, 1376, 71 USPQ2d 1837, 1843 (Fed. Cir. 2004) ("[L]ike the term 'comprising,' the terms 'containing' and 'mixture' are open-ended."). "Configured to" or "operable for" is used to connote structure by indicating that the mechanisms/units/components include structure that performs the task or tasks during operation. "Configured to" may include adapting a manufacturing process to fabricate components that are adapted to implement or perform one or more tasks.

"Based On." As used herein, this term is used to describe factors that affect a determination without otherwise precluding other or additional factors that may affect that determination. More particularly, such a determination may be solely "based on" those factors or based, at least in part, on those factors.

All terms of example language (e.g., including, without limitation, "such as", "like", "for example", "for instance", "similar to", etc.) are not exclusive of other examples and therefore mean "by way of example, and not limitation . . . ".

A description of an embodiment having components in communication with each other does not infer that all enumerated components are needed.

A commercial implementation in accordance with the scope and spirit of the present disclosure may be configured according to the needs of the particular application, whereby any function (s of the teachings related to any described embodiment of the present invention may be suitably changed by those skilled in the art.

The flowchart and block diagrams in the figures illustrate the architecture, functionality, and operation of possible implementations of systems and methods according to various embodiments. Functions noted in the block may occur out of the order noted in the figures. For example, two blocks shown in succession may, in fact, be executed substantially concurrently, or the blocks may sometimes be executed in the reverse order, depending upon the functionality involved.

Further, any sequence of steps that may be described does not necessarily indicate a condition that the steps be performed in that order. Some steps may be performed simultaneously.

The functionality and/or the features of a particular component may be alternatively embodied by one or more other devices that are not explicitly described as having such functionality/features. Also, various embodiments of the present invention need not include a device itself.

More specifically, as will be appreciated by one skilled in the art, aspects of the present invention may be embodied as a system and/or method. Furthermore, aspects of the present invention may take the form of a plurality of systems to enable gas meter to perform self-checking to determine its overall functioning without requiring a meter operator.

Introduction

Embodiments of the present invention include a system with a gas meter/energy meter. Within the gas meter can be a flow tube that is configured to receive a flow measured by an ultrasonic flow measurement. A pressure dropper can be configured in a center region or other region within the flow tube. The pressure dropper can enable a drop in pressure as the flow measured by the ultrasonic flow measurement is passing through the flow tube. A controller can be configured underneath the flow tube. The controller can monitor the flow measured by the ultrasonic flow measurement and determine if the flow tube is functioning correctly.

Above the gas meter, a heat source/hot wire and one or more temperature sensors can be configured. In an embodiment, a complementary-metal-oxide-semiconductor (CMOS) chip is configured, while in other embodiments, the heat source/hot wire and temperature sensors are configured without the CMOS chip. In another embodiment, one or more negative temperature coefficient (NTC) devices can be configured over the gas meter.

The gas meter can have another controller configured over the gas meter near the heat source and temperature sensors. A bypass can also be configured over the gas meter. The heat source can provide heat to enable a flow measured by a thermal massflow measurement to occur within the bypass. The temperature sensors can monitor the temperature of the flow measurement. The controller near the heat source can determine if any part of the flow measurement based on thermal massflow is functioning correctly.

Another controller can be configured within a meter index. The third controller can also determine a ratio of the flow measured by the ultrasonic flow measurement to the flow measured by the thermal massflow measurement. Accordingly, the each of the controllers can also determine whether the components of the gas meter are functioning properly. In addition, the controllers can also calculate the density, thermal conductivity of the system and a gas and/or energy content of the gas.

System Structure

FIG. 1 illustrates a block diagram of a gas meter 100, which can be implemented in accordance with an embodiment. The gas meter 100 can include a flow tube 110. Within the flow tube 110, gas flow will occur through the flow tube 110. The gas flow can be measured with two transducers 150 through an ultrasonic flow measurement (also shown in FIGS. 2, 4, 5, and 6). A pressure dropper 115 is positioned in the middle of the flow tube 110. The pressure dropper 115 will ensure a drop of pressure within the flow tube 110. A controller 120 will be configured underneath the flow tube 110. The gas meter 100 also includes a complementary metal-oxide semiconductor (CMOS) chip 125 positioned on the exterior of the flow tube 110. A controller can be configured within the CMOS chip 125. In addition, a heat source 130 and temperature sensors 135 and 135 are also configured within the CMOS chip 125. A bypass 140 is illustrated near the CMOS chip 125.

Referring to FIG. 1, a flow measured by an ultrasonic flow measurement will occur within the flow tube 110. The controller 120 will monitor the flow measured by the ultrasonic flow measurement. Dust and ageing within the flow tube 110 can affect the flow tube 110.

In FIG. 1, within the CMOS chip 125, the heat source 130 and temperature sensors 135, 135 are configured to enable a flow measured by a thermal massflow measurement to occur within a bypass 140. As with the flow measured by the ultrasonic flow measurement mentioned above, dust and ageing within the bypass 140 can affect the flow measured by the thermal massflow measurement.

In FIG. 1, the controller 120 can monitor the flow measured by the ultrasonic flow measurement within the flow tube 110. Further, the controller within the CMOS chip 125 can monitor the flow measured by the thermal massflow measurement. The controller 120 can determine if any part of the ultrasonic flow measurement or the flow measurement based on the thermal massflow is functioning correctly. If the rate of the flow measured by the ultrasonic flow measurement is not equivalent to the flow measured by the thermal massflow measurement, then the controller 120 and the controller within the CMOS chip 125 can determine that one or more issues within the gas meter 100 exists. Such issues can include ageing of the gas meter 100. Another issue can be dust within the flow tube 110 or within the bypass 140 or even in or near the CMOS chip 125. In contrast, if the flow measured by the ultrasonic flow measurement is equivalent to the flow measured by the thermal massflow measurement, than the controller 120 and the controller within the CMOS chip 125 can determine that the overall gas meter 100 is functioning correctly. Further, the controllers 120, (controller within CMOS chip 125) can also determine a density and thermal conductivity of the gas within the gas meter 100 while determining a ratio of the flow measured by the ultrasonic flow measurement to the flow measured by the thermal massflow measurement. The density and the thermal conductivity of the gas and the flow rate can be used to determine the gas and/or energy content of the gas within the gas meter 100.

Figure 2:
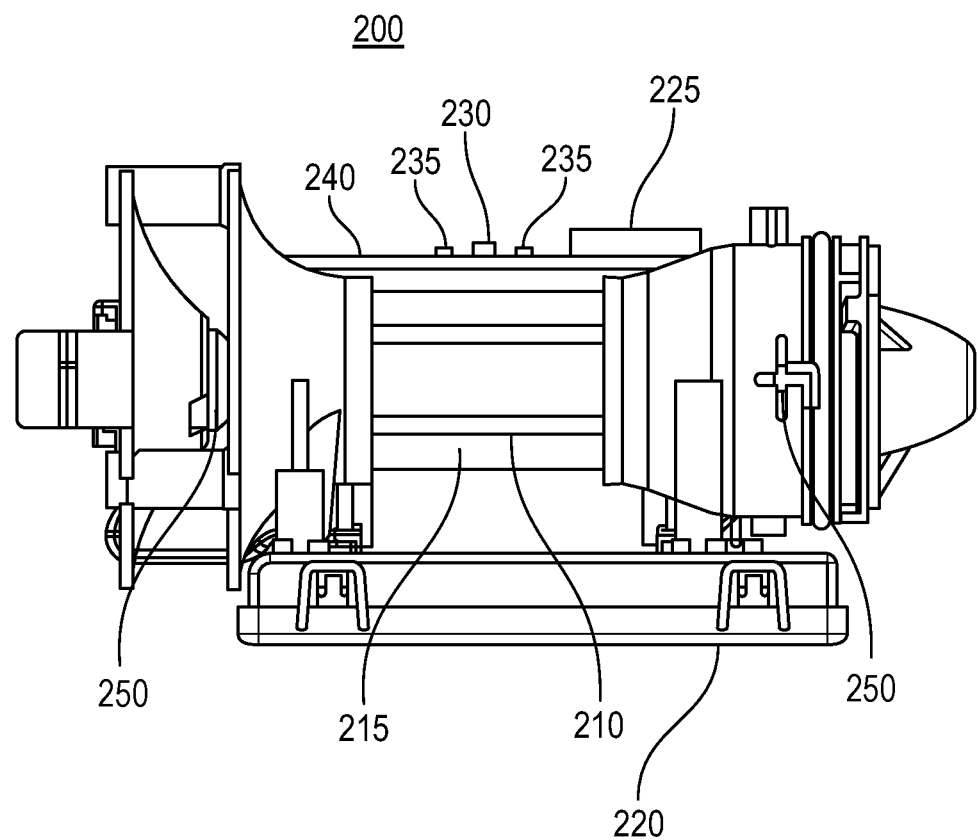
FIG. 2 illustrates another implementation of a gas meter in accordance with an embodiment of the invention.

Referring to FIG. 2, another embodiment of a gas meter 200 is illustrated. The gas meter 200 includes a flow tube 210 with a pressure dropper 215 and a controller 220 configured near the flow tube 210. The pressure dropper 215 can allow a drop in pressure within the flow tube 210 as flow measured by two transducers 250 and an ultrasonic flow measurement within the flow tube 210. The gas meter 200 also has a heat source 230 and temperature sensors 235. The heat source 230 can provide the required heat to enable a flow measured by a thermal massflow measurement to occur within a bypass 240. The temperature sensors 235 can monitor the temperature of the flow measured by the thermal massflow measurement. A controller 225 can be configured near the heat source 230 and temperature sensors 235.

In FIG. 2, the drop in pressure occurs within the flow tube 210 via the pressure dropper 215 as the flow measured by the ultrasonic flow measurement occurs within the flow tube 210. The controller 220 can monitor the flow measured by the ultrasonic flow measurement within the flow tube 210 to ensure that the flow tube 210 is functioning correctly. Dust and ageing within the flow tube 210 can affect the rate of the flow measured by the ultrasonic flow measurement. Within the bypass 240, the flow measured by the thermal massflow measurement can occur. The controller 225 can monitor the flow measurement within the bypass 240 to determine if any part of the flow the bypass 240, heat source 230, temperature sensors 235 or any components of the flow measurement based on thermal massflow are functioning correctly.

Referring to FIG. 2, the controller 220 will determine if the flow tube 210 is functioning correctly based on a ratio of the flow measured by the ultrasonic flow measurement to the flow measured by the thermal massflow measurement. Similarly, the controller 225 can also determine if the bypass 240, heat source 230, temperature sensors 235 are functioning correctly. If the flow measured by the ultrasonic flow measurement is not equivalent to the flow measured by the thermal massflow measurement, the controllers 220, 225 can determine that one or more problems can exist within the gas meter 200. The controllers 220, 225 can determine that dust or another issue within the bypass 240 and/or the flow tube 210 is causing the unequal readings. The controllers 220, 225 can also determine if ageing effects within the bypass 240, flow tube 210, or other parts of the gas meter 200 are the cause for the unequal flow measurements.

In FIG. 2, the controllers 220, 225 can determine that the components of the gas meter 200 are functioning properly if the flow measured by the ultrasonic flow measurement is equal to the flow measured by the thermal massflow measurement. In other words, the controllers 220, 225 can determine if any part of the ultrasonic flow measurement or any part of the flow measurement based on the thermal massflow is functioning correctly. Controllers 220, 225 can also calculate the ratio of the two flow measurements, the thermal conductivity and the density of the gas meter 200 as well. The controllers 220, 225 can determine a gas content and/or energy due to the calculated density, thermal conductivity, and rate flow based on the equal ratio of the flow measured by the ultrasonic flow measurement to the flow measured by the thermal massflow measurement.

Figure 3:
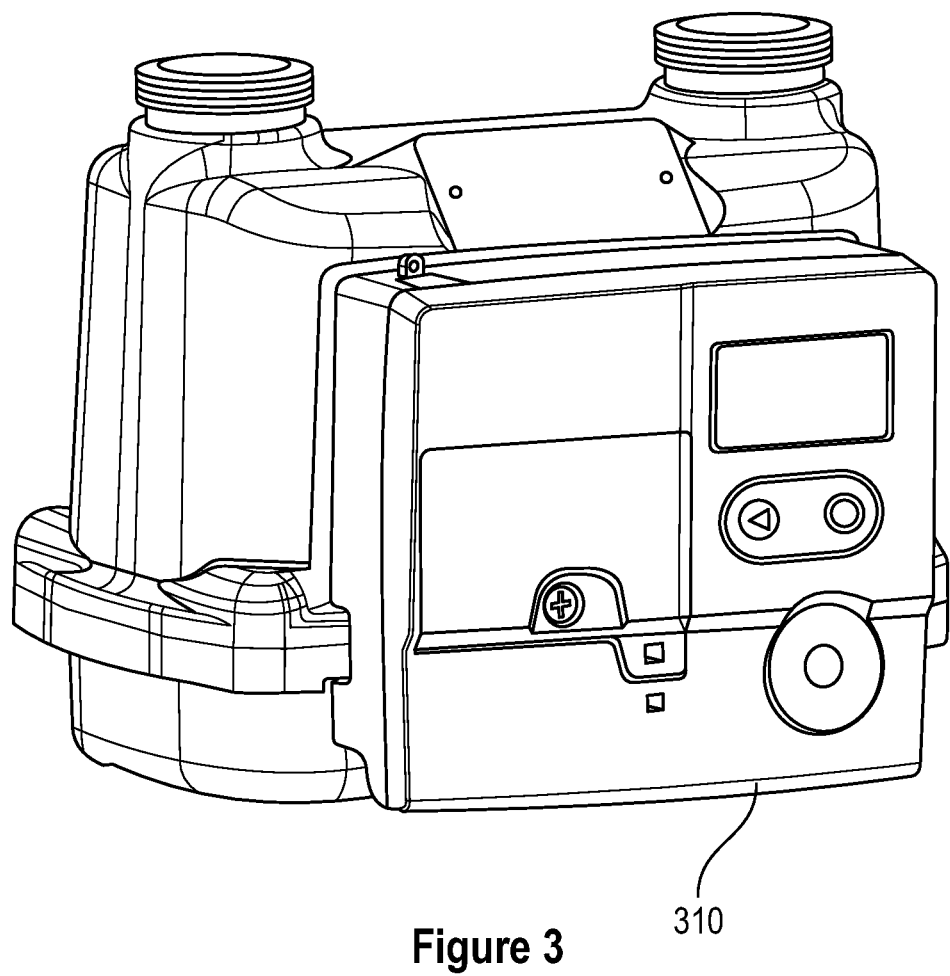
FIG. 3 illustrates a meter index in accordance with an embodiment of the invention.

Referring to FIG. 3, a housing 300 is illustrated. The housing 300 includes a meter index configured with another controller/third controller 310. The controller 310 can also monitor the flow measured by an ultrasonic flow measurement and the flow measured by a thermal massflow measurement. The controller 310 can also identify the ratio of the flow measured by the ultrasonic flow measurement to the flow measured by the thermal massflow measurement. The controller 310 can identify if ageing within components of the gas meter 300 and/or dust within the gas meter 300 could have caused the flow measured by the ultrasonic flow measurement to not be equal to the flow measured by the thermal massflow measurement.

In FIG. 3, the controller 310 can also determine that the components of the gas meter 300 are functioning correctly when the above-described flows are equal to each other. The controller 310 can determine if any part of the ultrasonic flow measurement or any part of the flow measurement based on thermal massflow is functioning correctly. Further, the controller 310 can also calculate a density and a thermal conductivity, and also a gas content and/or energy content as well.

Figure 4:
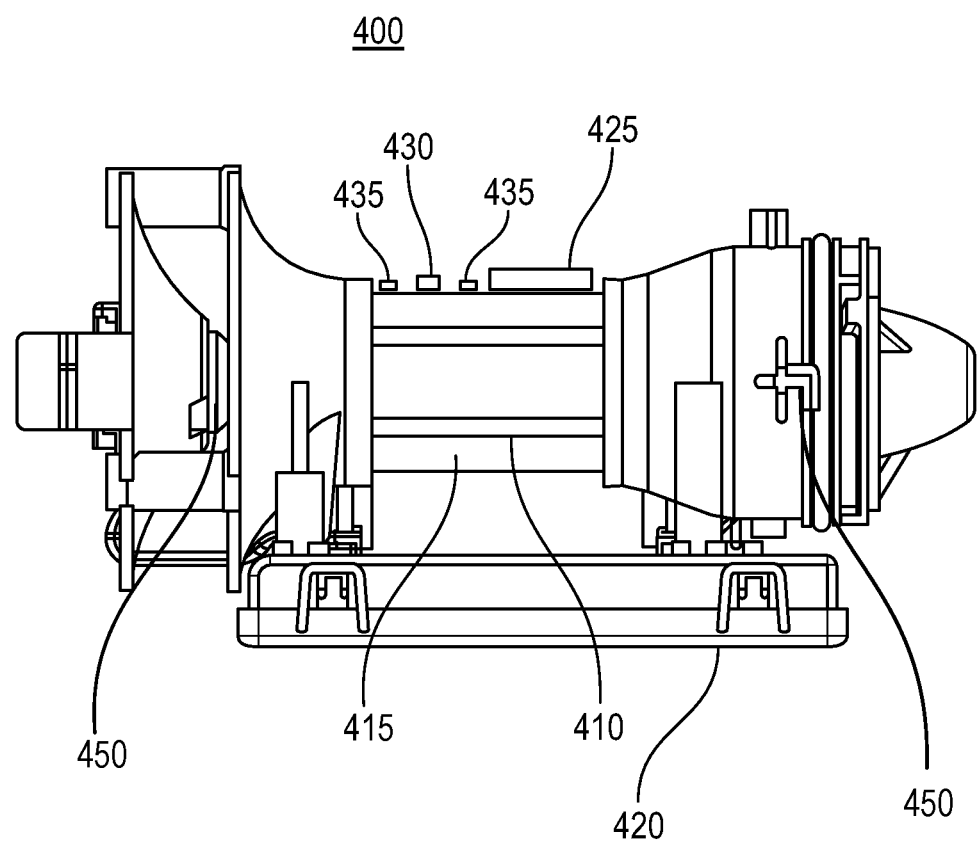
FIG. 4 illustrates another embodiment in accordance with the invention.

In FIG. 4, another embodiment of gas meter 400 is illustrated. The gas meter 400 is configured with a flow tube 410. A pressure dropper 415 is configured in the middle of the flow tube 410. The pressure dropper 415 is configured to enable a drop in pressure within the flow tube 410 as flow measured by an ultrasonic flow measurement is passing through the flow tube 410. The gas flow can be measured with two transducers 450 through an ultrasonic flow measurement. A controller/second controller 420 is configured underneath the flow tube 410 and the pressure dropper 415. Above the gas meter 400, another controller/first controller 425 is configured. Next to the controller 425, a hot wire 430 is configured along with two temperature sensors 435. In other embodiments, the temperature sensors 435 can be configured in other regions around the gas meter 400.

Referring to FIG. 4, flow measured by an ultrasonic flow measurement will occur within the flow tube 410. The pressure dropper 415 will also allow a drop in pressure within the flow tube 410 as the flow measured by the ultrasonic flow measurement is flowing within the flow tube 410. The controller 420 can monitor the gas flow 410 and determine if the flow tube 410, and pressure dropper 415 are functioning correctly.

With respect to FIG. 4, a flow measured by a thermal massflow measurement can occur. The hot wire 430 can provide the heat required for the flow measured by the thermal massflow measurement to occur. The temperature sensors 435 can identify the temperature required. The controller 425 can monitor the flow measured by the thermal massflow measurement and determine whether the components the hot wire 430, and temperature sensors 435 are functioning properly as well.

In FIG. 4, the controllers 420, 425 can both determine a ratio of the flow measured by the ultrasonic flow measurement to the flow measured by the thermal massflow measurement. The controllers 420, 425 can determine that problems can exist within the flow tube 410, hot wire 430, temperature sensors 435 or other parts of the gas meter 400 if the ratio of the flows are not equivalent. Based on the ratio of the flows, the controllers 420, 425 can determine if any part of the ultrasonic flow measurement or any part of the flow measurement based on thermal massflow is functioning correctly. Dust and/or ageing within the flow tube 410, or the hot wire 430 and temperature sensors 435 can cause the ratio of the flow measured by the ultrasonic flow measurement and the flow measured by the thermal massflow measurement to be affected.

Referring to FIG. 4, the controllers 420, 425 can determine that the gas meter 400 overall is functioning correctly if the flow measured by the ultrasonic flow measurement is equal to the flow measured by the thermal massflow measurement.

Figure 5:
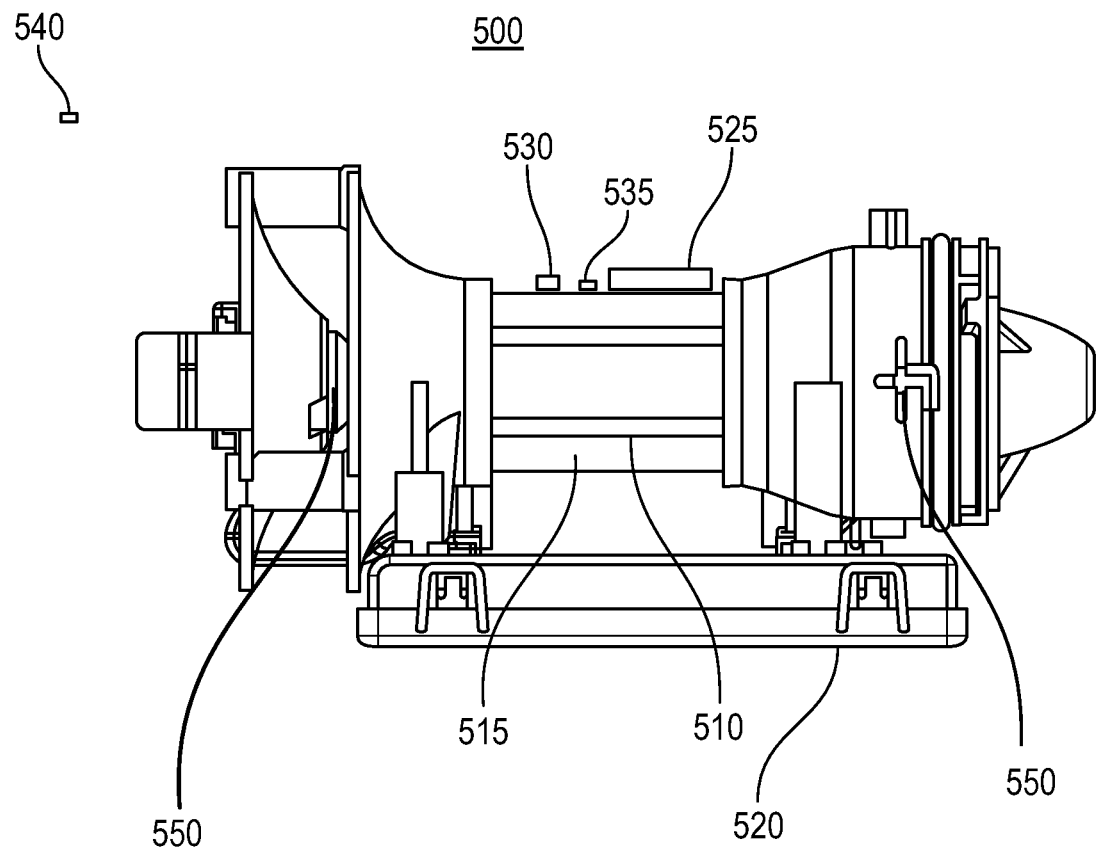
FIG. 5 illustrates a further embodiment in accordance with an embodiment of the invention.

With respect to FIG. 5, another embodiment of a gas meter 500 is illustrated. The gas meter 500 is configured with a flow tube 510. A pressure dropper 515 can be configured in the middle of the flow tube 510 near the center region of the flow tube 510. The pressure dropper 515 can enable the pressure to drop within the flow tube 510 as a flow measured by an ultrasonic flow measurement is passing through the flow tube 510. The gas flow can be measured with two transducers 550 through an ultrasonic flow measurement A controller/second controller 520 can monitor the flow tube 510. Above the gas meter 500, another controller/first controller 525 is configured. A heat source 530 is also configured above the gas meter. A temperature sensor/second temperature sensor 535 is also configured above the gas meter 500. Further, another temperature sensor/first temperature sensor 540 can be configured in one or more positions outside or within the gas meter 500.

In FIG. 5, above the gas meter 500, the heat source 530 can provide the heat needed for a flow measured by a thermal massflow measurement. The temperature sensors 535 and 540 can monitor the temperature of the flow measured by the thermal massflow measurement.

Referring to FIG. 5, as the flow measured by the ultrasonic flow measurement and the flow measured by the thermal massflow measurement occur, the controllers 520, 525 can identify the ratio of the corresponding flows. If the flow measured by the ultrasonic flow measurement does not match the flow measured by the thermal massflow measurement, the controllers 520, 525 can determine that one or more parts of the gas meter 500 are not functioning properly. According to the ratio of the flows, the controllers 520, 525 can determine if any part of the ultrasonic flow measurement or any part of the flow measurement based on thermal massflow is functioning correctly. Ageing and dust within the components of the gas meter 500 can cause the corresponding flows to not be equal. As such, the controllers 520, 525 can identify or one or more problems that exist within the gas meter 500 based on the ratio of the flow measured by the ultrasonic flow measurement to the flow measured by the thermal massflow measurement.

Referring to FIG. 5, the controllers 520, 525 can also determine that the gas meter 500 and its components such as the flow tube 510, pressure dropper 515 the heat source 530, and temperature sensors 535, 540 are functioning correctly if the corresponding flow rates are equal. Further, the controllers 520, 525 can calculate a density and thermal conductivity while determining the ratio of the flow measured by the ultrasonic flow measurement to the flow measured by the thermal massflow measurement. The controllers 520, 525 can then identify a gas content and/or energy of the gas meter 500.

Figure 6:
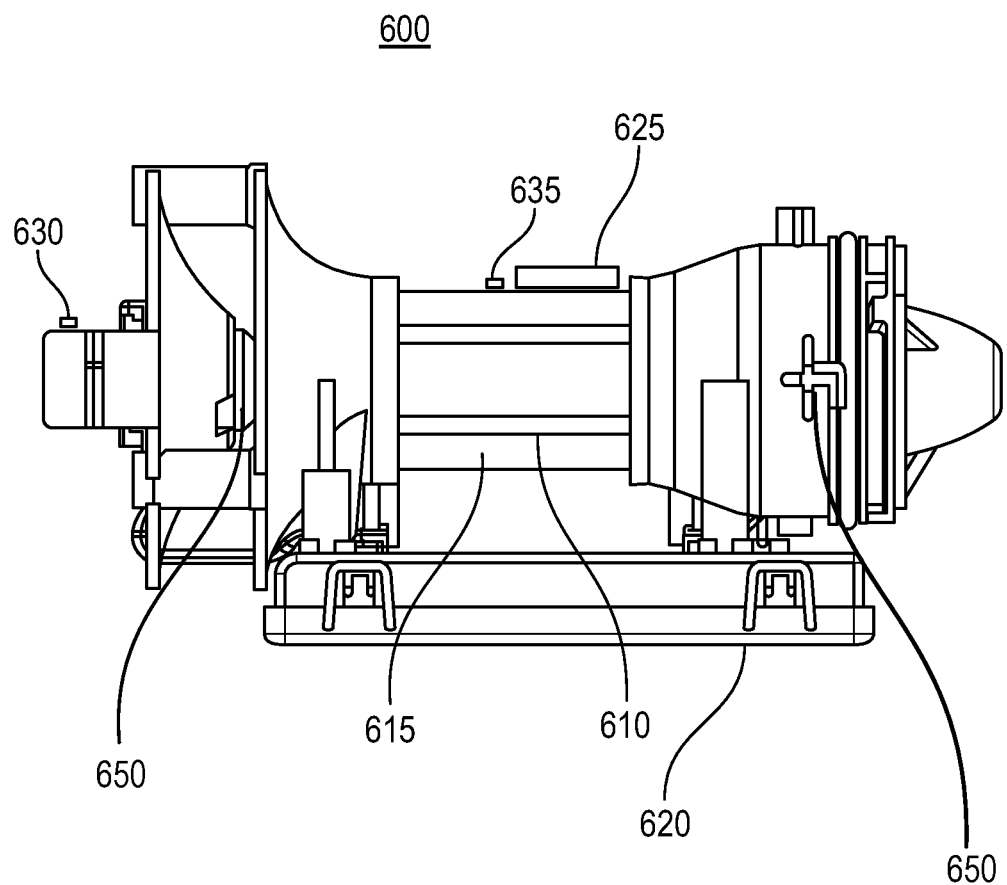
FIG. 6 illustrates a gas meter/energy meter in accordance with an embodiment of the invention.

With respect to FIG. 6, a gas meter 600 with a different heating source than what is described for FIGS. 1-5 is illustrated. Unlike FIGS. 1-5, negative temperature coefficient (NTC) devices, a first NTC 630, and a second NTC 635 are illustrated. An electric current can be used to charge the first NTC 630 and the second NTC 635. Also illustrated are a flow tube 610, a pressure dropper 615, a controller/second controller 620, and a controller/first controller 625.

In FIG. 6, a flow measured by an ultrasonic flow measurement occurs within the flow tube 610. The pressure dropper 615 can enable a drop in pressure within the flow tube 610 as the flow measured by the ultrasonic flow measurement passes through the flow tube 610. The gas flow can be measured with two transducers 650 through an ultrasonic flow measurement. The controller 620 can monitor the rate of the flow measured by the ultrasonic flow measurement to ensure that the pressure dropper 615 and flow tube 610 are functioning correctly.

Still in FIG. 6, an electric current can provide heat to the first NTC 630 and the second NTC 635 for a period of time. After the first NTC 630 and the second NTC 635 have been provided the heat, the rate at which the temperature is decreasing can be used to determine a flow measured by a thermal massflow measurement. A rapid drop in pressure can lead to a high flow measurement, while a steady or slow drop in temperature can lead to a slower flow measurement. The rate at which the temperature is decreasing for the first NTC 630 and the second NTC 635 can be used to determine the flow measured by the thermal massflow measurement. The first NTC 630 is also always used to calculate a thermal conductivity of gas. The controller 625 can monitor the flow measured by the thermal massflow measurement to determine if the first NTC 630 and the second NTC 635 are functioning properly.

In FIG. 6, when a ratio of the flow measured by the ultrasonic flow measurement is not equal to the flow measured by the thermal massflow measurement, the controllers 620, 625 can determine that the one or more of the components described above are also not functioning correctly. Moreover, the controllers 620, 625 can determine if any part of the ultrasonic flow measurement or the flow measurement based on thermal massflow is functioning correctly. Ageing and or dust can affect the flow tube 610, pressure dropper 615, controllers 620, 625, first NTC 630, and second NTC 635. Accordingly, the ageing and dust can also thereby affect the ratio of the corresponding flows.

Referring to FIG. 6, when the flow measured by the ultrasonic flow measurement is equal to the flow measured by the thermal massflow measurement, then the controllers 620, 625 can determine that the components of the gas meter 600 are functioning correctly. In addition, the controllers 620, 625 can determine both the density and thermal conductivity, and also a gas content and/or energy of the gas meter 600. The controllers 620, 625 can determine the gas content and/or energy based on the calculated density, thermal conductivity, and flow rate.

Figure 7:
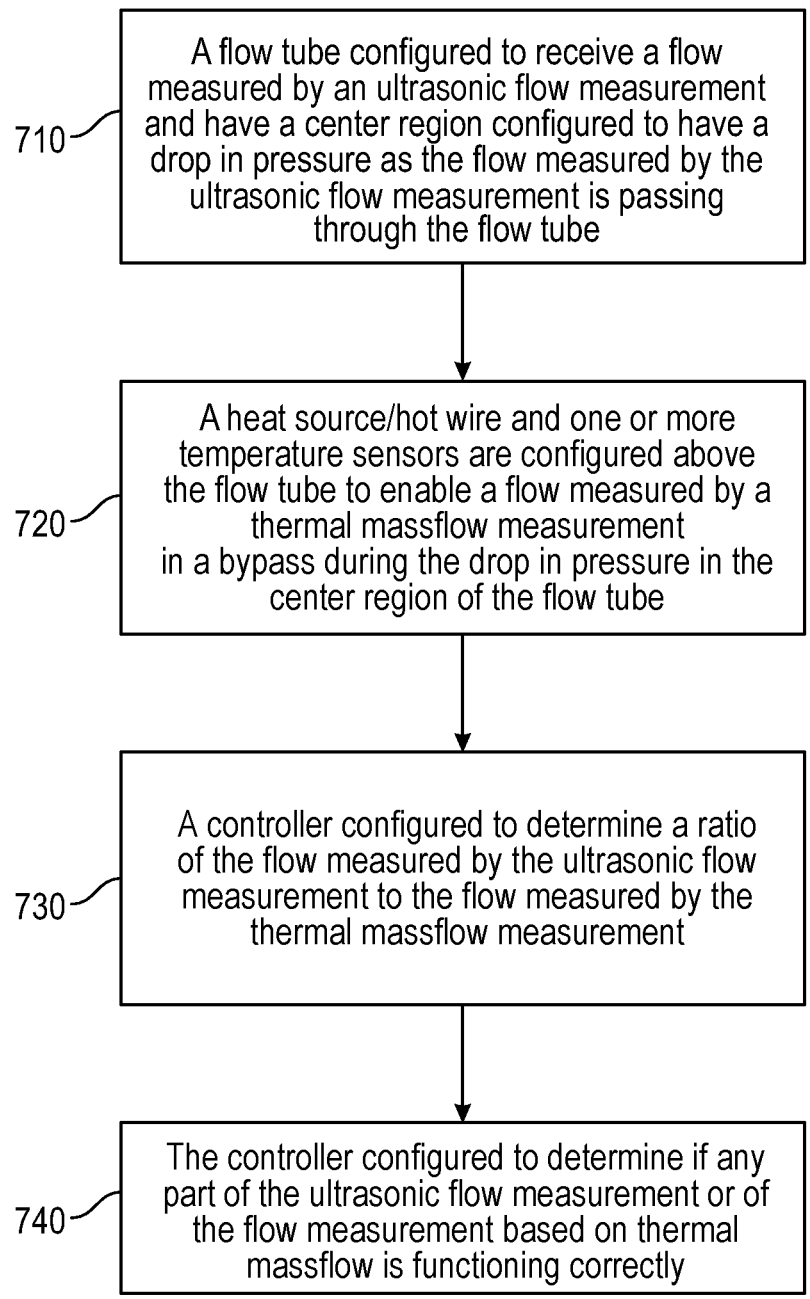
FIG. 7 illustrates a method describing the implementation of the gas meter in accordance with an embodiment of the invention.

FIG. 7 illustrates a method 700 wherein a ratio of the flow measured by the ultrasonic flow measurement to the flow measured by the thermal massflow measurement. One or more controllers configured within the gas meter can determine if the components of the gas meter system are functioning correctly based on a ratio of the corresponding flows.

In FIG. 7, at step 710, a flow tube is configured within the gas meter. The flow tube is configured to receive the flow measured by the ultrasonic flow measurement. A center region of the flow tube is configured to have a drop in pressure as the flow measured by the ultrasonic flow measurement is passing through the flow tube. A pressure dropper can be configured in the middle of the flow tube to enable the drop in pressure.

In FIG. 7, at step 720, a flow measurement based on thermal massflow is configured above the center region of the flow tube. Within the flow measurement based on thermal massflow, a heat source and temperature sensors are configured. Further, the heat source and temperature sensors are configured to enable a flow measured by a thermal massflow measurement to occur in in a bypass configured above the gas meter. The flow measured by the thermal massflow measurement can occur during the drop in pressure in the center region of the flow tube.

In FIG. 7, at step 730, a controller configured to compare the flow measured by the ultrasonic flow measurement to the flow measured by the thermal massflow measurement. The controller can determine the ratio of the flow measured by the ultrasonic flow measurement to the flow measured by the thermal massflow measurement.

In FIG. 7, at step 740, the controller can determine if the flow tube, heat source, and temperature sensors are functioning properly. As such, the controller can determine if any part of the ultrasonic flow measurement or if any part of the flow measurement based on the thermal massflow is functioning correctly. The controller can determine if the components of the gas meter are functioning correctly based on the ratio of the flow measured by the ultrasonic flow measurement to the flow measured by the thermal massflow measurement. The controller can determine if problems can exist with the flow tube, the heat source and temperature sensors if the corresponding flows are not equal. In contrast, the controller can determine that the flow tube and other components of the gas meter are functioning correctly if the flow measured by the ultrasonic flow measurement is equal to the flow measured by the thermal massflow measurement.

Those skilled in the art will appreciate that the example embodiments are non-exhaustive and that embodiments other than that described here may be included without departing from the scope and spirit of the presently disclosed embodiments.

Advantages

The gas meter in the embodiments described above has a controller configured near the flow tube of the gas meter, and a controller configured on an exterior portion of the gas meter. Another controller is configured within a meter index.

Further, the three controllers can monitor the flow measured by the ultrasonic flow measurement. The controllers can also monitor the flow measured by the thermal massflow measurement that occurs within a bypass or at the top portion of the gas meter.

Each of the controllers can determine based on the ratio of the flow measured by the ultrasonic flow measurement to the flow measured by the thermal massflow measurement whether one or more problems can exist with the components of the gas meter system. Based on the ratio of the flows, the controllers can determine if any part of the ultrasonic flow measurement or the flow measurement based on thermal massflow is functioning correctly. Such problems can be caused by dust buildup with one or more of the components. The problems can also occur due to the ageing of the components, which can cause the corresponding flows. The controllers can also determine that the gas meter system is functioning properly, when the flow measured by the ultrasonic flow measurement is equal to the flow measured by the thermal massflow measurement. The gas meter can measure energy instead of volume, and thereby exclude the additional calculations from volume to energy.

Conclusion

All references, including granted patents and patent application publications, referred herein are incorporated herein by reference in their entirety.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Various aspects of the invention have been described above by way of illustration, and the specific embodiments disclosed are not intended to limit the invention to the particular forms disclosed. The particular implementation of the system provided thereof may vary depending upon the particular context or application. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

The corresponding structures, materials, acts, and equivalents of all means or step plus function elements in the claims below are intended to include any structure, material, or act for performing the function in combination with other claimed elements as specifically claimed.

The invention claimed is:

1. A system comprising:
 a flow tube configured within a medium, wherein the flow tube is configured to receive a flow measured by an ultrasonic flow measurement, wherein a center region of the flow tube is configured to have a drop in pressure as the flow measured by the ultrasonic flow measurement is passing through the flow tube;
 a heat source and temperature sensors configured above the center region of the flow tube, wherein the heat source and temperature sensors are configured to enable a flow measurement measured by a thermal massflow measurement in a bypass during the drop in pressure in the center region of the flow tube; and
 a controller configured to measure the flow measured by ultrasonic flow measurement and the flow measured by the thermal massflow measurement, wherein the controller is further configured to:
 compare the flow measured by the ultrasonic flow measurement to the flow measured by the thermal massflow measurement;
 determine a ratio for the flow measured by the ultrasonic flow measurement to the flow measured by the thermal massflow measurement;
 determine one or more issues associated with at least one of the flow tube or the bypass based on the ratio of the flow measured with the ultrasonic flow measurement to the flow measured by the thermal massflow measurement; and
 wherein the one or more issues comprise ageing or dust in the flow tube.

2. The system of claim 1, wherein the controller determines if the bypass is functioning correctly based on the ratio of the flow measured by the ultrasonic flow measurement to the flow measured by the thermal massflow measurement.

3. The system of claim 1, wherein the controller identifies a gas and/or energy content based on a calculated density, thermal conductivity and a flow rate based on an equivalent ratio of the flow measured by the ultrasonic flow measurement to the flow measured by the thermal massflow measurement.

4. The system of claim 1, wherein the controller calculates a density and thermal conductivity.

5. The system of claim 1, wherein an electrical current provides a charge to the heat source and temperature sensors.

6. The system of claim 1, wherein the controller identifies if the flow measured by the ultrasonic flow measurement is equal to the flow measured by the thermal massflow measurement.

7. A system comprising:
 a heat source/hot wire and one or more temperature sensors configured at initial first positions, wherein the heat source/hot wire and the one or more temperature sensors are configured to enable a flow measured by a thermal massflow measurement;

a flow tube, housing, and index configured at second positions, wherein a center region of the flow tube is configured to provide a drop in pressure, wherein a flow measured by an ultrasonic flow measurement occurs within the flow tube, wherein the flow measured by the ultrasonic flow measurement occurs at a same time interval as the flow measured by the thermal massflow measurement, wherein the heat source/hot wire and the one or more temperature sensors are configured to enable the flow measured by the thermal massflow measurement in a bypass during the drop in pressure in the center region of the flow tube; and one or more controllers are configured to:

compare the flow measured with the ultrasonic flow measurement with the flow measured with the thermal massflow measurement;

identify a ratio of the flow measured with the ultrasonic flow measurement to the flow measured by the thermal massflow measurement;

determine one or more issues associated with at least one of the flow tube or the bypass based on the ratio of the flow measured with the ultrasonic flow measurement to the flow measured by the thermal massflow measurement; and wherein the one or more issues comprise ageing or dust in the flow tube.

8. The system of claim 7, wherein the heat source/hot wire and the one or more temperature sensors provide at least one of negative temperature coefficient (NTC) or positive temperature coefficient (PTC) to NTC and PTC devices.

9. The system of claim 8, wherein the flow measured by the thermal massflow measurement is calculated by identifying a rate at which a temperature for at least one of the NTC devices is decreasing.

10. The system of claim 7, wherein one of the temperature sensors is configured away from the other temperature sensor.

11. The system of claim 7, wherein the bypass is configured above the flow tube.

12. The system of claim 7, wherein the one or more controllers are configured to calculate whether the flow measured with the ultrasonic flow measurement is equal or unequal to the flow measured with the thermal massflow measurement.

13. The system of claim 7, wherein the one or more controllers calculate a density and a thermal conductivity.

14. The system of claim 7, wherein the one or more controllers identify a gas and/or energy content based on a calculated thermal conductivity, density and a flow rate based on an equivalent ratio of the flow measured by the ultrasonic flow measurement to the flow measured by the thermal massflow measurement.

15. A method comprising:

configuring a flow tube to receive a flow measured by an ultrasonic flow measurement, wherein a center region of the flow tube is configured to have a drop in pressure as the flow measured by the ultrasonic flow measurement is passing through the flow tube;

positioning a heat source and temperature sensors above the center region of the flow tube, wherein the heat source and temperature sensors are configured to enable a flow measured by a thermal massflow measurement in a bypass during the drop in pressure in the center region of the flow tube; and configuring a controller to:

compare the flow measured by the ultrasonic flow measurement with the flow measured by the thermal massflow measurement;

determine a ratio of the flow measured with the ultrasonic flow measurement with the flow measured by the thermal massflow measurement; and determine one or more issues associated with at least one of the flow tube or the bypass based on the ratio of the flow measured with the ultrasonic flow measurement to the flow measured by the thermal massflow measurement; and wherein the one or more issues comprise ageing or dust in the flow tube.

16. The method of claim 15, wherein the controller identifies a gas content and/or energy content.

17. The method of claim 15, wherein the controller calculates a density and a thermal conductivity.

18. The method of claim 15, wherein the heat source and temperature sensors provide at least one of negative temperature coefficient (NTC) or positive temperature coefficient (PTC) to NTC and PTC devices.

19. The method of claim 15, wherein the flow measured by the ultrasonic flow measurement is not equal to the flow measured by the thermal massflow measurement.

20. The method of claim 15, wherein the flow measured by the ultrasonic flow measurement is equal to the flow measured by the thermal massflow measurement.

* * * * *